June 26, 1962 H. M. GREENE, JR 3,041,459
RADIANT ENERGY CONTROL SYSTEM
Filed June 29, 1959 2 Sheets-Sheet 1

INVENTOR.
HOWARD M. GREENE, JR.
BY
ATTORNEY

June 26, 1962  H. M. GREENE, JR  3,041,459
RADIANT ENERGY CONTROL SYSTEM
Filed June 29, 1959  2 Sheets-Sheet 2
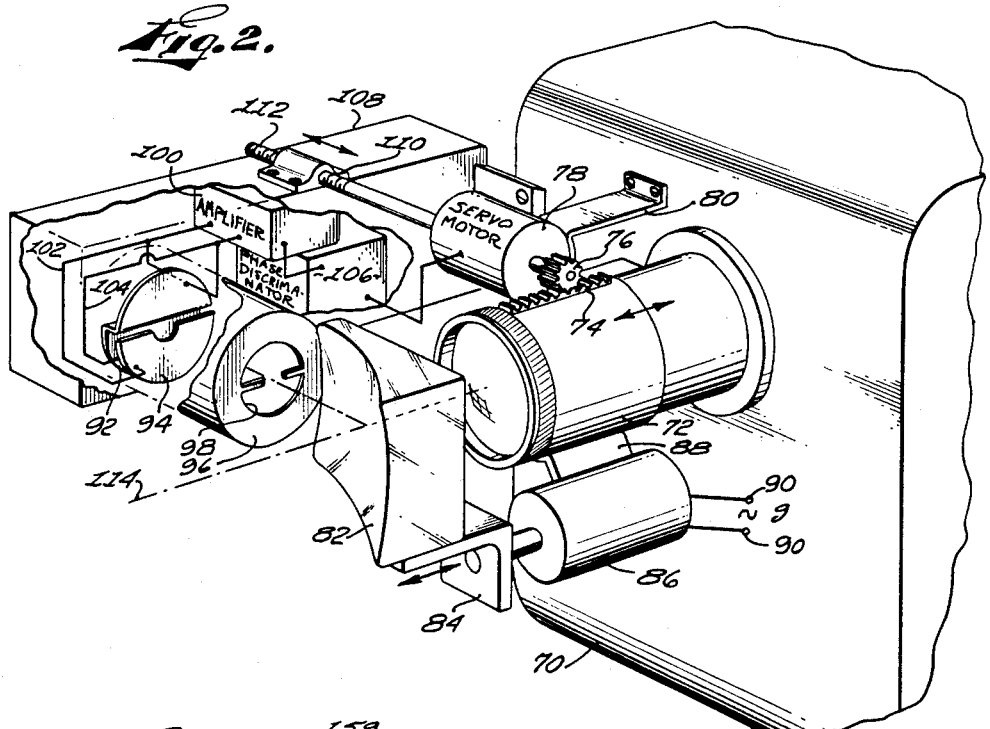
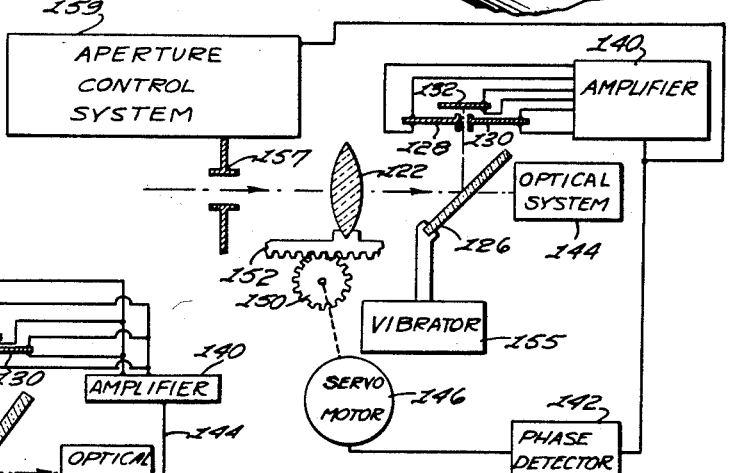
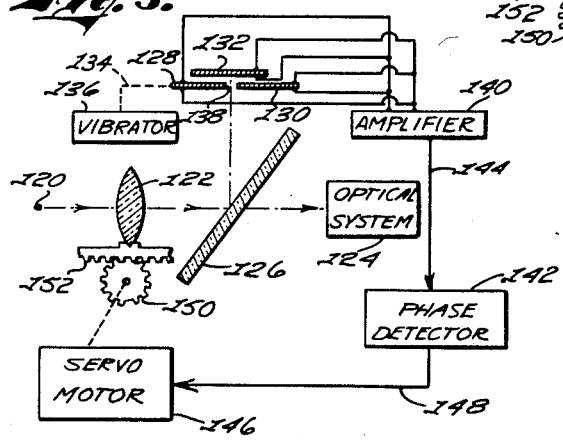
INVENTOR.
HOWARD M. GREENE, JR.
BY
ATTORNEY United States Patent Office 3,041,459
Patented June 26, 1962

3,041,459
RADIANT ENERGY CONTROL SYSTEM
Howard M. Greene, Jr., Northridge, Calif., assignor to Comapco, Inc., Encino, Calif., a corporation of California
Filed June 29, 1959, Ser. No. 823,607
10 Claims. (Cl. 250—201)

The present invention relates to a control system which utilizes radiant energy to develop electrical signals which may be employed for control purposes in various applications of the present invention.

It has been previously proposed to provide a system for observing changes in a field of vision and to form an electrical signal indicative of any such change. Various forms of systems of this type have been adapted to perform automatic focusing or ranging operations, as well as to measure distance and serve in proximity warning systems. Of course, many other applications exist for these systems; however, it is sometimes desired to concentrate control operations upon a single object in a field of vision. For example, in taking motion pictures, it is generally desirable to maintain certain persons or objects in focus regardless of everything else in the field of vision. Therefore, a need exists for a radiant-energy control system which is capable of selectively sensing a particular object in a field of vision.

In general, the present invention comprises a control system utilizing radiant energy to develop an electrical control signal. The system includes a focusing device to form an image of a field of observation. A sensing device, including a plurality of radiation-sensitive surfaces, is then positioned to sense the energy passed by the focusing device. The system further incorporates apparatus for producing an oscillatory movement between the sensing device and the focal plane of the focusing device. The electrical signals formed by the plurality of radiation-sensitive surfaces are then combined into a composite signal which manifests observations of a selected object in the field focused by the focusing device. An automatic control circuit may also be included in the system to regulate the operation thereof with variations in light intensity.

An object of this invention is to provide an improved automatic-control system utilizing radiant energy.

Another object of the present invention is to provide an automatic control system which is capable of selectively sensing or observing a particular object in a field of vision.

Still another object of the present invention is to provide an improved system for maintaining a camera in focus with respect to a selected object.

A further object of the present invention is to provide a system for manifesting the distance to a selected object from a point of observation.

A still further object of the present invention is to provide an improved system for utilizing radiant energy to develop a signal indicative of a characteristic of a particular object in the field of vision, which system employs a sensing device incorporating a plurality of radiation-sensitive surfaces to facilitate selection of a particular object.

One further object of the present invention is to provide an improved system of automatic control, employing radiant energy, wherein a selected object is observed, and means is included for automatic regulation according to the amount of light radiated from the object.

These and other objects and advantages of the present invention will become apparent from the following detailed description when taken in conjunction with the appended drawings wherein:

FIGURE 2 is a perspective and diagrammatic view of another system constructed in accordance with the present invention;

FIGURE 3 is a diagrammatic representation of still another system constructed in accordance with the present invention; and FIGURE 4 is a diagrammatic representation of still a further system constructed in accordance with the present invention.

Figure 1:
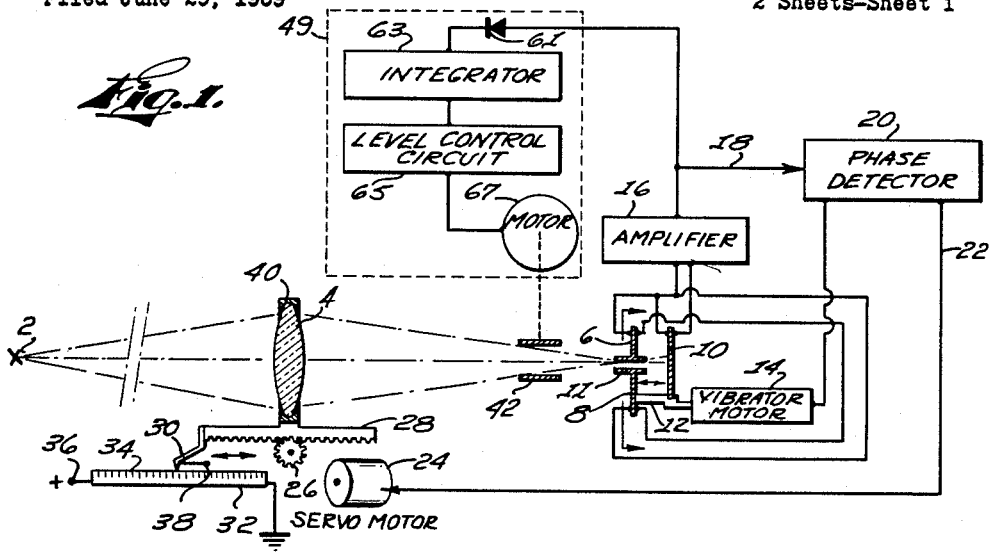
FIGURE 1 is a diagrammatic representation of a system constructed in accordance with the present invention.

Referring initially to FIGURE 1, there is shown an object 2 which is illuminated and therefore comprises a source of radiant energy. The radiation from the object 2 is focused by a lens 4. A pair of semi-circular radiation-sensitive elements 6 and 8 are positioned substantially at the focal plane of the lens 4 and are commonly mounted with a third radiation-sensitive member 10. In general, in the operation of the system, control signals are formed by combining the electrical signals developed by the radiation-sensitive members 6, 8 and 10. The plurality of radiation-sensitive elements enables the control signals formed to selectively indicate observations of the object 2.

Considering the system of FIGURE 1 in greater detail, the radiation-sensitive elements 6, 8 and 10 may for example comprise solar cells, e.g. cells formed of silicon crystals containing certain impurities as well known in the prior art. Another exemplary form of the elements 6, 8 and 10 is photoelectric elements in a photoelectric cell; however, it is to be understood that virtually any radiation-sensitive material may be employed in a system of the present invention.

The elements 6 and 8 are mounted in abutting relationship to form a circular configuration, and a small opaque hollow semi-cylinder 11 is affixed at the center of the configuration. The semi-cylinder 11 allows the use of an inexpensive lens 4 by extending the range of operation through a poorly-focused focal plane.

The radiation-sensitive opaque elements 6, 8 and 10 are supported upon a bracket 12 which is mechanically driven by a vibrator 14. The vibrator 14 may comprise an electromagnetic coil, or various other forms of devices for providing an oscillatory motion.

The elements 6, 8 and 10 develop a potential difference on opposite sides thereof which, in general, varies as the radiant energy striking the radiation-sensitive surfaces of the members. These potentials are applied to an amplifier 16 to be mixed into a single composite signal, the phase of which is indicative of the character, e.g. location, of the object 2.

The amplifier 16 is connected through a line 18 to apply the composite signal to a phase detector 20 which functions to generate a direct-current signal in a conductor 22, which signal is indicative of the phase of the composite signal relative to a reference signal, as from the vibrator 14.

Various forms of circuits which may be employed as the phase detector 20 are well-known which function to provide a signal capable of variation in both directions from a reference level to indicate the direction and extent of phase shift relative to a signal from a reference.

The conductor 22 is connected to a servo motor 24 which rotates in one direction or the other, depending upon the polarity of a received signal. The motor 24 is mechanically coupled to a gear 26 mounted in engagement with a rack 28. The motor 24 is controlled by the signal in the line 22 and drives the gear 26 in either direction depending upon observations of the object 2.

The rack 28 has an electrical-contact pointer 30 affixed upon one end thereof, which pointer comprises the movable element of a potentiometer 32 having a scale 34 mounted thereon. The potentiometer 32 is connected between ground and the terminal 36, adapted to be connected to a source of potential. The sliding contact pointer 30 is connected to a terminal 38 which provides a signal, the amplitude of which manifests the location of the object 2 relative to the system.

Affixed upon the rack 28 is a ring 40 which carries the lens 4 so that as the rack 28 is variously positioned, the focal plane is similarly moved. It is to be noted, that the radiant energy passing through the lens 4 to impinge upon the elements 6, 8 and 10 passes through a variable-aperture stop 42 which serves to limit the light passed to the elements 6, 8 and 10.

Figure 1A:
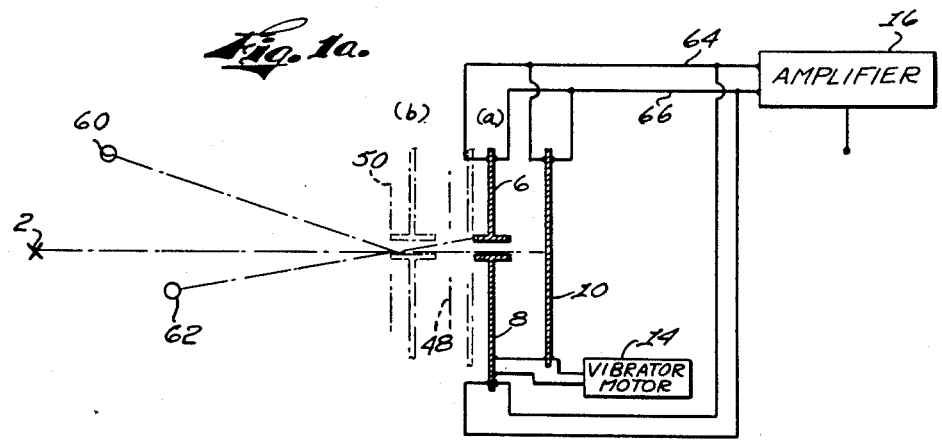
FIGURE 1a is an enlarged view of a portion of FIGURE 1.

Reference will now be had to FIGURE 1a for description of the operation of the system to maintain the object 2 in focus and thereby provide a visual and electrical indication of the distance from the apparatus to the object 2.

Figure 1B:
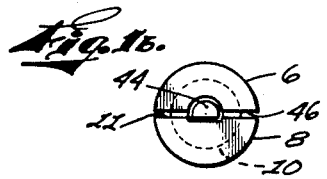
FIGURE 1b is a plan view of an apparatus embodied in the system of FIGURE 1.

The elements 6, 8 and 10, as shown in the figures, have surfaces which are electrically discrete; however, these elements may be formed into a single unit. The arrangement of the elements 6, 8 and 10 is illustrated in FIGURE 1b which shows the center aperture 44 defined by the hollow cylinder 11 which is held between the abutting elements 6 and 8 separated by a gap 46.

The vibratory or oscillatory motion applied to the elements 6 and 8 carries them between the position (a) as shown, and the position (b), shown in phantom in FIGURE 1a. As the elements 6 and 8 move between the positions (a) and (b), the radiant energy, from the object 2, reaching a plane 48 is varied at a frequency substantially twice the frequency of the oscillating elements 6 and 8 because the elements 6 and 8 alternately move into the conical light beams on either side of the focal plane. That is, assuming the elements 6 and 8 are at the plane 48 and move away from the object 2, the radiant energy permitted to strike the element 10 decreases until the elements 6 and 8 reach position (a). As the elements 6 and 8 move toward the object 2, the energy striking the member 10 increases to a maximum point (occurring as the elements 6 and 8 pass through the focal plane 48) then decreases to a minimum level as the elements 6 and 8 reach position (b). Return to the focal plane 48, by the elements 6 and 8 (completing one cycle) permits increased radiation to pass to the element 10.

As a result of the above consideration, it may be seen that when the elements 6 and 8 oscillate about the focal plane 48, a double-frequency signal is formed to indicate that the object 2 is focused at the plane 48. Now, if the object 2 moves so that the focal plane is advanced to a plane 50, the elements 6 and 8 oscillate entirely in one light cone, and therefore the frequency of the signal formed as a result of the energy impinging upon the element 10 coincides to the frequency of the vibrator 14. This change to one-half the former frequency is detected by the phase detector 20 (FIGURE 1) and formed into an analog signal in the conductor 22 to cause the motor 24 to position the lens 4 so that the focal plane is restored to plane 48.

In view of the above consideration, it is evident that the energy striking the element 10 may be employed to form the desired control signal. However, in certain applications of the system other light sources, as sources 60 and 62 (FIGURE 1a), may confuse the system if the signal is formed entirely from the energy striking the element 10. For example, if the source 62 provides light of a greater intensity than the light reflected from the object 2, the light striking the element 10 from the source 62 may greatly exceed the light striking the element 10 from the object 2. As a result, the signal formed exclusively from the radiation impinging upon the element 10 may tend to become confused if it is employed as a selective control signal in certain applications. In accordance with the principles of the present invention, signals indicative of the radiant energy impinging upon the elements 6 and 8 are formed whereby to render the system selective with respect to a particular object in a field of vision. That is, the radiant energy impinging upon a plurality of areas positioned substantially at the focal plane is observed and the resulting observations are combined to manifest the character, e.g. location, of an object 2. The manner of combining the signals indicative of the radiant energy striking various radiation-sensitive surfaces on the elements 6, 8 and 10 to provide selectivity will now be considered.

Referring to FIGURE 1a, it may be seen that the light source 62 provides radiant energy to elements 6 and 10 and as these elements oscillate, the total energy from the source 62, striking the elements 6 and 10 remains substantially constant. However, the energy striking the individual elements 6 and 10 varies in a complementary fashion. Therefore, the elements 6 and 10 are connected in an additive manner, e.g. parallel, so that the radiant energy from the source 62 which impinges on elements 6 and 10, produces a direct-current component signal in the output, which signal is blocked by the alternating-current amplifier 16.

The element 8 extends to the axis of the radiation from the object 2; therefore, radiant energy from the source 60 manually strikes only the element 8 and produces a direct-current signal which is blocked by the amplifier 16. Therefore, the signals produced by radiant energy from the sources 60 and 62 are both blocked by amplifier 16 and do not interfere with the desired signal.

The radiant energy from the selected object, strikes all three of the elements 6, 8 and 10. The elements 6 and 10 are connected in an aiding relationship; however, the elements 8 and 10 are connected in opposition. That is, the radiation-sensitive surfaces of the elements 6 and 10 are connected to conductor 64 while the radiation-sensitive surface of the element 8 is connected to the conductor 66. Of course, the rear surfaces of the elements 6, 8 and 10 are connected to a conductor alternate from the radiation-sensitive surfaces. As the elements 6 and 10 are connected in an additive mode and the element 8 is connected in a subtractive mode, the net signal produced by the radiation from the object 2 is an alternating signal indicative of a selected portion of radiation from the object 2.

In considering the operation of the system of FIGURE 1, it is important to note that the upper and lower portions of the object 2 are alternately passed to the element 10 as the elements 6 and 8 oscillate about the focal plane. This consideration results from the element 8 (extending to the axis of the radiation) alternately obstructing rays on opposite sides of the focal plane. As a result, the pattern of the object 2 is immaterial to the signal passing through the amplifier 16.

In the system of FIGURE 1, light source that are remote from the selected object are prevented from reaching the radiation-sensitive elements by an adjustable stop 42 controlled by an aperture control system 49. The amplitude of the signal from the amplifier 16 varies as the amount of light which strikes the element 10. In the operation of the system a selected level of light is maintained by controlling the aperture in the stop 42 according to the amplitude of the signal from the amplifier 16.

The signal from the amplifier 16 is applied through a diode 61 to an integrator circuit 63. Therefore, the alternating signal is rectified and formed into a continuous analog signal indicative of the amplitude of the signal from the amplifier 16. The continuous signal is then adjusted in level by a circuit 65 so as to drive a motor 67 in either direction with excursions from a predetermined level. The motor 67 varies the aperture in the stop 42, and as a result, the radiant energy passed to the radiation-sensitive apparatus is regulated.

Reference will now be made to the system of FIGURE 3 which shows a system of the present invention mounted upon a camera 70 to maintain the camera focused upon a selected object. The camera 70 may comprise various optical systems, for example a motion picture or television camera. An adjustable lens casing 72 is provided on the camera for focusing selected objects. The lens casing 72 has a rack 74 mounted thereon, the teeth of which are engaged by the teeth of a gear 76. The gear 76 is driven by a servo motor 78 affixed to the camera 70 by a bracket 80. The servo motor 78 is a bidirectional motor and is capable of moving the lens casing 72 either toward or away from the camera body.

The electrical signal employed to control the motor 78 is developed from the light of the object upon which the camera 70 is to be focused, and this light also passes through the lens casing 72 to be utilized in the camera 70.

The radiation or light from the selected object passes through a partial mirror 82 mounted in front of the lens casing 72 and supported upon a bracket 84 which is in turn connected to a vibrating coil 86. The vibrating coil 86 is affixed to the lens casing 72 by a shock mount 88 and is connected to terminals 90 which are adapted to be connected to a source of alternating-current energy.

The partial mirror 82 may comprise a beamsplitter which passes substantially one-half of the received light to the lens casing 72 and reflects the remaining light for the development of a control signal. The mirror 82 is a focusing mirror and provides an image on elements 92 and 94 which elements are somewhat shielded by an enclosure 96 containing an aperture 98.

The elements 92 and 94 are radiation-sensitive and may comprise various devices as the elements of FIGURE 1. In FIGURE 2, the element 92 is formed to occupy two planes and functions as the elements 6 and 10 in the system of FIGURE 1. That is, as the elements 6 and 10 in FIGURE 1 are connected in aiding electrical relationship, these elements may be integrally-formed as shown in the system of FIGURE 2.

The elements 92 and 94 are connected to an amplifier 100 by conductors 102 and 104. However, the connections of the element 94 are such that the signal developed thereon opposes the signal developed on the member 92 to produce a differential signal. The amplifier 100 serves to amplify the differential signal formed by the members 92 and 94 and applies that signal to a phase detector 106 which is in turn connected to control the motor 78. The phase detector 106 develops a signal having an amplitude indicative of frequency variations from a standard, and a sense indicative of the phase of the frequency variation. That is, as explained in detail with respect to FIGURE 1, in the event that the frequency of the signal from the amplifier 100 changes, the phase detector 106 develops a control signal to drive the motor 78 and restore focus at the desired plane. The direction in which the motor 78 moves is dependent upon the direction of the change in frequency by the signal from the amplifier 100.

The motor 78, in addition to being mechanically coupled to the lens casing 72 also engages a housing 108 which is supported by an internally-threaded support 110 carried upon a threaded portion of the shaft 112 of the motor 78. As a result, movement by the motor 78 not only changes the position of the lens casing 72 but also moves the housing 108 with respect to the mirror 82 to maintain the proper relationship.

In the operation of the system of FIGURE 2, the camera 70 is sighted so that the selected target is centered at the optical axis 114 of the mirror 82 and the optical system in the lens casing 72. The radiant energy from the object which passes through the mirror 82 is imaged by the optical system of the camera and employed therein. However, the reflected portion of the radiant energy passes through the aperture 98 in the enclosure 96 (which serves to shield the borders between the members 92 and 94) and is imaged upon the elements 92 and 94. The radiation-sensitive elements 92 and 94 are effectively moved in an oscillatory manner relative to the focal plane of the radiant energy impinging thereon because of the oscillatory movement of the mirror 82. That is, as the mirror 82 is oscillated, the light passing therethrough is not affected; however, the light reflected from the mirror 82 is varied to move the focal plane thereof in an oscillatory fashion with respect to the elements 92 and 94. As a result, an oscillating signal is formed across the conductors 102 and 104 just as previously described with respect to the system of FIGURE 1. At a time when this oscillating signal has a frequency twice the frequency of the signal applied to the terminals 90, the elements 92 and 94 are positioned substantially at the focal plane of the mirror 82, the utilization device in the camera 70 is at the focal plane of the optical system in the lens casing 72. As long as the signal from the amplifier 100 is twice the frequency of the signal applied at the terminals 90, the focus of the camera 70 is correct. If the object of interest moves with respect to the camera 70, the frequency of the signal applied to the amplifier 100 changes and the change is sensed by the phase detector 106 to energize the motor 78 which varies the position of the mirror 82 and the housing 108 to restore focus upon the elements 92 and 94. Of course, in performing these changes, the servo motor 78 also varies the position of the lens casing 72 to correctly focus the camera upon the selected object.

Reference will now be had to FIGURE 3 which diagrammatically illustrates an alternative form of the system of the present invention employed to maintain an optical system in focus. In the system of FIGURE 3, an object 120 is imaged, by a lens 122, for use in an optical system 124. The optical system 124 may comprise a television or motion picture camera for example.

A partial mirror 126 is positioned between the lens 122 and the optical system 124. The mirror 126 may for example reflect substantially one-half of the light striking the surface which faces the lens 122, and pass the remainder. Of course, the light or radiation transmitted through the mirror 126 enters, and is employed in the optical system 124. The radiation reflected from the mirror 126 strikes radiation-sensitive elements 128, 130 and 132 which function to form a control signal.

The elements 128, 130 and 132 may comprise solar cells or various other radiation-sensitive elements as indicated above, and are mechanically coupled by a bracket 134 to a vibrator 136 to be oscillated along to the optical axis of the radiation reflected from the mirror 126. The element 132 is stationary and is mounted so as to receive all the radiation passing through an aperture 138 formed between the opaque elements 128 and 130.

The elements 128, 130 and 132 are connected to an amplifier 140 in the manner previously described so that signals from elements 130 and 132 are additively combined while signals from the element 128 are subtractive. As described in detail with respect to FIGURE 1, the result of this combination is a voltage which upon application to an amplifier 140 produces a signal indicative of the character of the object 120 on the optical axis of the lens 122. The phase detector 142 receives the signal from the amplifier 140 and provides a signal to a motor 146 (through a conductor 148) which signal indicates frequency variations in the signal from the amplifier 144 to drive the motor in either direction thereby revolving a gear 150 to move a rack 152 upon which the lens 122 is carried. The positioning of the lens 122 returns the frequency of the signal from the amplifier 140 to indicate an in-focus condition wherein the optical system 124 or other utilization device receives a properly focused radiation pattern.

An important features of the system of FIGURE 3 resides in the use of a single lens 122 and a simple beamsplitter in the form of a partial mirror 126. Furthermore, in the system of FIGURE 3, only the radiation-sensitive members 128 and 130 are moved in an oscillatory manner. Of course, the member 132 will receive all the radiation passing through the aperture 138 regardless of whether it is moved or not. Therefore, the member 132 is mounted stationary resulting in a simpler mounting arrangement.

FIGURE 4 shows a variation of the system of FIGURE 3 which includes automatic light level control. Similar components are similarly identified in the two FIGURES.

In the system of FIGURE 4, the radiation-sensitive elements are fixed and the mirror 126 is oscillated by a vibrator 155. Therefore, the oscillating mirror 126 provides the movement between the radiation-sensitive elements 128, 130 and 132, and the focal plane of the subject image to enable the system to operate in a manner similar to that of FIGURE 3.

The system of FIGURE 4 also incorporates a stop 157 which is automatically controlled by an aperture control system 159 (as previously described with respect to FIGURE 1) connected to receive a signal from the amplier 140.

An important feature of the system of FIGURE 4 resides in the use of the single lens to focus the subject for both control and use in the optical system, in conjunction with a simple vibration apparatus.

In considering the above-described invention, it is apparent that a primary objective accomplished thereby resides in the consideration that the system is capable of operating selectively in conjunction with a particular object. Furthermore, it is apparent that the aspect of the invention requiring relative movement between the radiation-sensitive surfaces or means and the focal plane of the focusing system may be accomplished in a variety of manners.

It should be noted that although the particular embodiments of the invention herein shown and described are fully capable of providing the advantages and achieving the objects previously set forth, such embodiments are merely illustrative of this invention and therefore modifications and changes may be made thereto without departing from the spirit of the invention or the scope of the following claims.

I claim:

1. A radiation-sensitive control system for forming a signal indicative of a selected area of a field of vision, comprising: radiation focusing means for focusing received radiation to an observation location; sensing means positioned to receive radiation from said focusing means for sensing the energy of radiation including energy radiated by said selected area at plural discrete areas of said field of vision at different locations relative to said observation location; means to vary the effective space relationship between said sensing means and said observation location in a recurring manner; and electrical signal means for combining the energy sensed from said plural discrete areas by said sensing means to form at least one composite control signal.

2. Apparatus according to claim 1 wherein said sensing means comprises a first member having a radiation-sensitive surface and having one edge formed to define a partial aperture and a second member having a radiation-sensitive surface positioned behind said first member.

3. Apparatus according to claim 2 wherein said sensing means includes an opaque shield containing an aperture corresponding to certain internal areas of said surfaces.

4. Apparatus according to claim 1 wherein said sensing means includes an adjustable stop to define the combined area of said plural areas.

5. Apparatus according to claim 1 wherein said sensing means includes first, second and third radiation-sensitive surfaces, said first and second surfaces being positioned in a first plane with an aperture therebetween, and said third surface being positioned in a second plane to receive radiation passing through said aperture.

6. Apparatus according to claim 5 wherein said electrical signal means combines an indication of the energy sensed by said first surface in opposition with the energy sensed by said second and third surfaces.

7. An apparatus according to claim 1 wherein said electrical signal means combines certain signals sensed by said discrete areas in opposition.

8. A control system comprising: focusing means; sensing means positioned substantially at the focal plane of said focusing means for sensing energy of a discrete area focused by said focusing means; means for varying the location of said sensing means relative to said focal plane in an oscillatory manner; first control means for varying the position of said sensing means in accordance with the phase energy sensed by said sensing means; and second control means for varying the radiation passing through said focusing means in accordance with the intensity of the radiation sensed by said sensing means.

9. A system for forming a signal selectively indicative of a field of vision comprising: focusing means for focusing said field of vision at a focal plane; sensing means for sensing different portions of the energy from said field of vision passed by said focusing means at different locations relative to said focal plane to form a plurality of signals; means to vary the effective position relationship between said sensing means and said focal plane in an oscillatory manner; and means for combining said plurality of signals into a signal indicative of a selected area in said field of vision.

10. A system for forming a signal selectively indicative of a field of vision comprising: focusing means for focusing said field of vision at a focal plane; sensing means comprising a plurality of discrete sensors mounted to receive different portions of said field of vision from said focusing means to form a plurality of signals indicative of the radiation received by said sensors; means for varying the position of sensing by said sensors relative to said focal plane in an oscillatory manner; and means for combining said plurality of signals into a signal indicative of a selected area in said field of vision.

References Cited in the file of this patent

UNITED STATES PATENTS

| | | |
|---|---|---|
| 1,648,058 | Parker | Nov. 8, 1927 |
| 1,766,885 | Dauvillier | June 24, 1930 |
| 2,193,606 | Ulrey | Mar. 12, 1940 |
| 2,259,323 | Peterman | Oct. 14, 1941 |
| 2,403,023 | Reynolds | July 2, 1946 |
| 2,489,305 | McLennan | Nov. 29, 1949 |
| 2,653,185 | Lubcke et al. | Sept. 22, 1953 |
| 2,831,057 | Orthuber | Apr. 15, 1958 |
| 2,838,600 | Salinger | June 10, 1958 |
| 2,867,393 | Burley | Jan. 6, 1959 |
| 2,868,060 | Akerman et al. | Jan. 13, 1959 |